No. 734,164. PATENTED JULY 21, 1903.
G. DINKEL.
APPARATUS FOR MAKING LIME SUCRATE.
APPLICATION FILED JAN. 14, 1903.
NO MODEL. 3 SHEETS—SHEET 2.

WITNESSES:
INVENTOR
ATTORNEY

No. 734,164. PATENTED JULY 21, 1903.
G. DINKEL.
APPARATUS FOR MAKING LIME SUCRATE.
APPLICATION FILED JAN. 14, 1903.
NO MODEL. 3 SHEETS—SHEET 3.

WITNESSES:
J. E. Pearson
Frank O'Connor

INVENTOR
G. Dinkel
BY
ATTORNEY

No. 734,164. Patented July 21, 1903.

UNITED STATES PATENT OFFICE.

GEORGE DINKEL, OF JERSEY CITY, NEW JERSEY, ASSIGNOR TO THE AMERICAN SUGAR REFINING COMPANY, A CORPORATION OF NEW JERSEY.

APPARATUS FOR MAKING LIME SUCRATE.

SPECIFICATION forming part of Letters Patent No. 734,164, dated July 21, 1903.

Application filed January 14, 1903. Serial No. 138,992. (No model.)

*To all whom it may concern:*

Be it known that I, GEORGE DINKEL, a citizen of the United States, residing at Jersey City, county of Hudson, State of New Jersey, have invented certain new and useful Improvements in Apparatus for Obtaining Lime Sucrate, of which the following is a specification.

My invention relates to apparatus through the instrumentality of which the sugar constituent of a solution of beet molasses and water may be combined with lime to form tricalsic sucrate. It has heretofore been proposed to add lime to the solution by distributing the lime in a fine powder over such portion of the surface of the solution as is exposed in the containing vessel and at the same time agitate the solution; further, to introduce the lime by blowing it into a powder and distributing it over the surface of a moving stream of the solution. In practice both of the described methods have been found objectionable, owing to the fact that neither method provides means for effecting a uniform distribution of a definite quantity of lime to a definite quantity of the solution or for preventing heating and forming of the solution due to the chemical reactions, gases, &c., which result when an indefinite quantity of lime is introduced into a large quantity of solution.

In practice I have found that if a definite quantity of lime is uniformly distributed to a definite quantity of solution within a given time the amount of lime required will be materially reduced and the heating and foaming of the solution cut down to a very considerable extent, if not entirely prevented. The apparatus described, therefore, may be said to have for its purpose, first, to decrease the amount of lime used; second, to provide means whereby an intimate and uniform mixture of the lime and molasses solution may be brought about; third, to provide means for measuring the quantity of lime introduced per unit of solution and time, and, fourth, to provide means for preventing foaming and heating.

The accompanying drawings will serve to illustrate my invention, in which—

Figure 1:
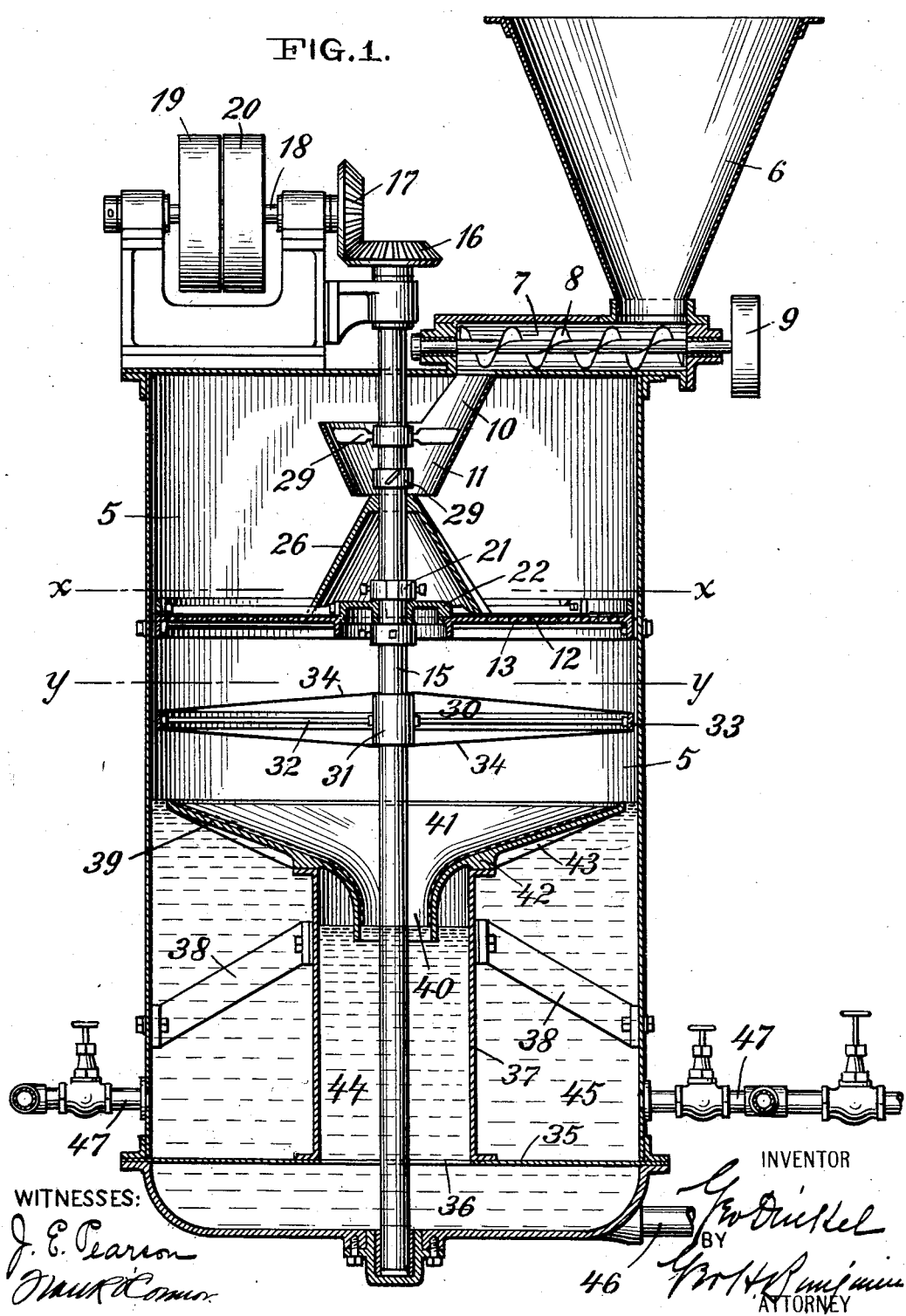
Figure 2:
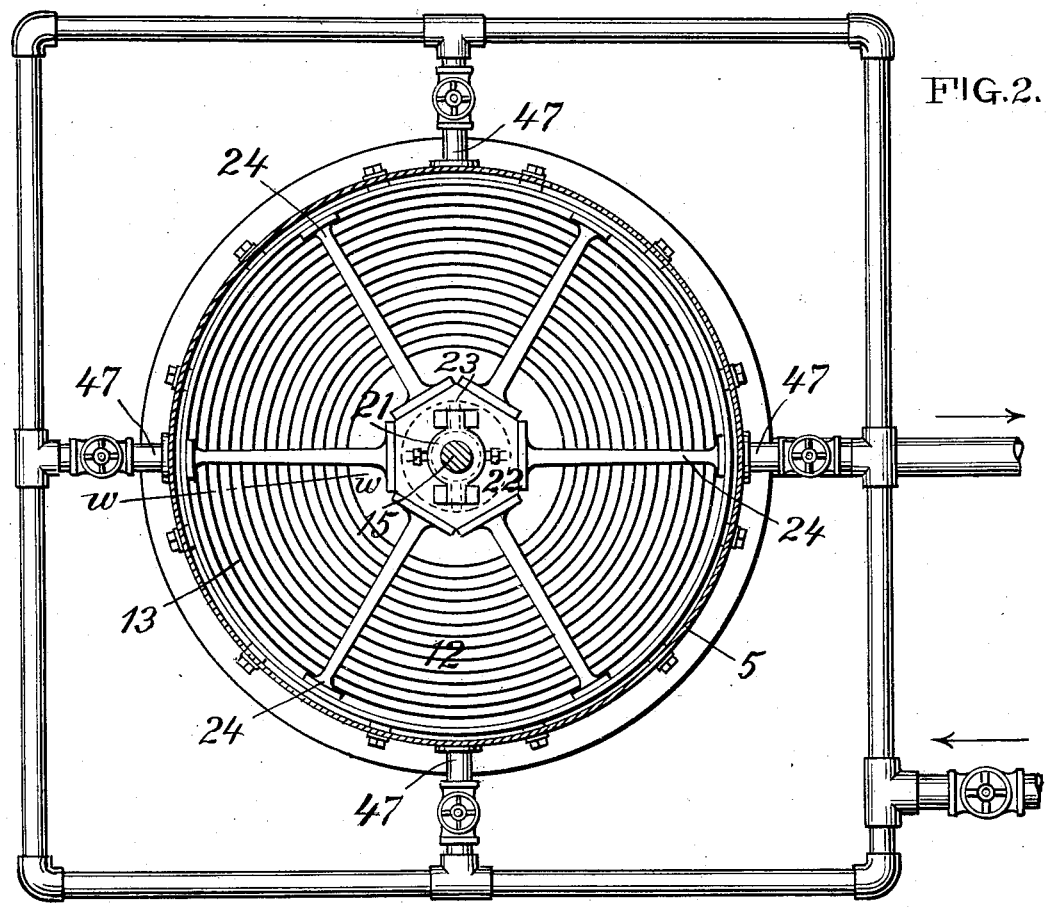
Figure 3:
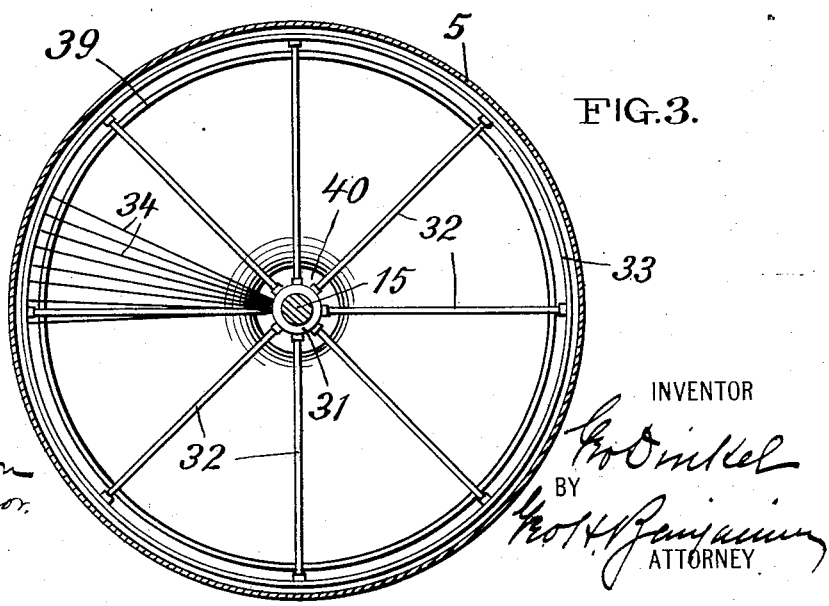
Figure 4:
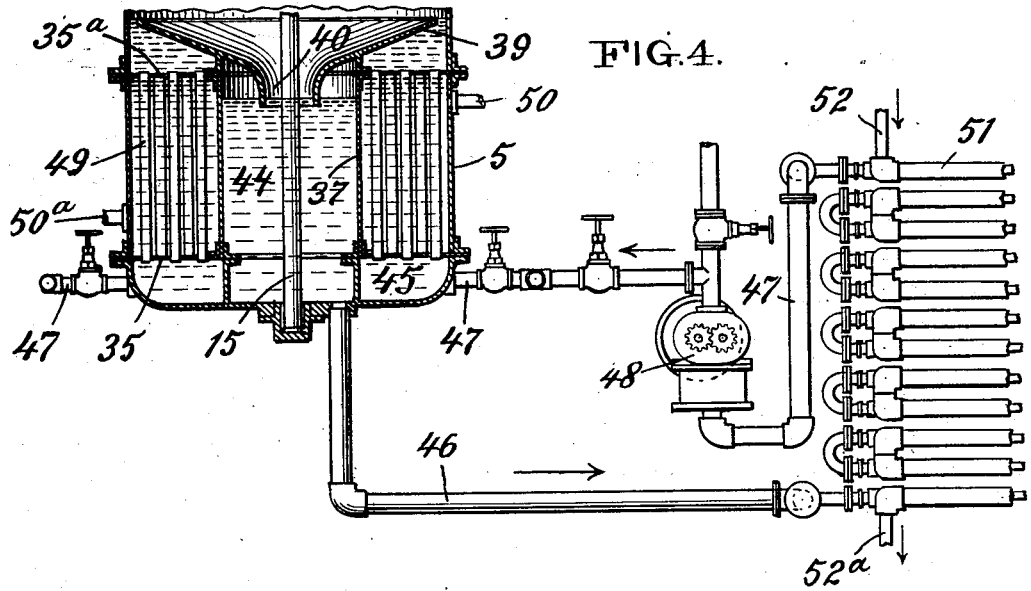
Figure 5:
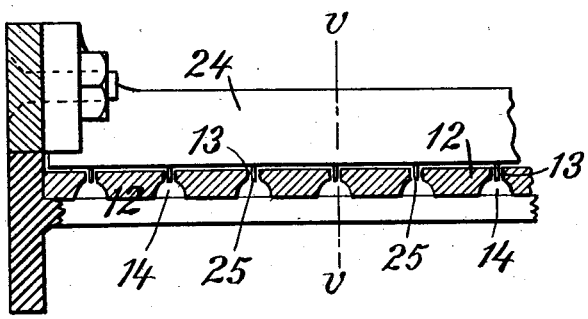
Figure 6:
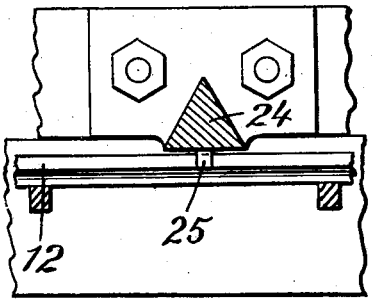
Figure 7:
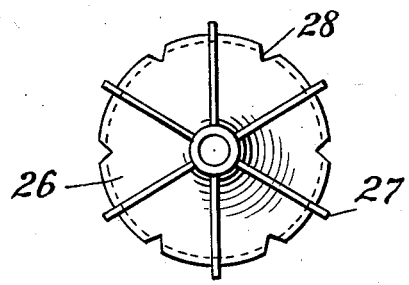

Figure 1 is a vertical section. Fig. 2 is a transverse section and plan on the line *x x* of Fig. 1. Fig. 3 is a transverse section and plan on the line *y y* of Fig. 1. Fig. 4 is a vertical section of the lower portion of the apparatus, showing the inclosing vessel provided with cooling apparatus and connected to an external cooling apparatus shown at the right in elevation. Fig. 5 is a side view of one of the distributing-arms and partial section of the distributing-plate, taken on the line W W of Fig. 2. Fig 6 is a vertical transverse section of one of the distributing-arms, taken on the line V V of Fig. 5. Fig. 7 is a top view of the distributing-cone.

Similar numerals indicate like parts.

In the drawings, 5 indicates the inclosing vessel, which may be of any required shape, preferably of greater height than width. Located on the top of the vessel is a feed-hopper 6, through which the lime is introduced in the form of a fine powder. The feed-hopper communicates at its bottom with a horizontal chamber 7, in which is located a feed-screw 8, adapted to be rotated by means of the pulley 9. The horizontal chamber 7 communicates, through a delivery-chute 10, with a fixed conical distributing-chamber 11, which I prefer to have open at the top.

Arranged transversely of the inclosing vessel is a distributing-plate 12, through which is formed the concentric and equally-spaced slots 13. These slots are wider at the bottom 14 than at the top and are preferably so made to prevent the permanent lodgment of lime or other materials in the slots. The slots, however, may be formed with parallel sides.

Arranged vertically in the inclosing vessel is a shaft 15, on the upper end of which is a beveled gear 16, in mesh with a beveled gear 17 on shaft 18, on which is located the loose pulley 19 and the fixed pulley 20.

Mounted on the shaft 15 over the distributing-plate 12 and secured in position thereon by means of an adjustable collar 21, so as to be rotated with the shaft, is the distributing-spider 22. This spider consists of the central hub 23 and the radial arms 24. The arms 24 are arranged equidistant and are triangular in section, as shown in Fig. 6. I give them this section so as to prevent lodgment of the lime on the top of the arms. Depending from the arms 24 and located in the slots 13 are the pins 25, corresponding in number along the arms with the number of concentric slots.

Situated over the spider and carried by the radial arms 24 is a distributing-cone 26. Formed on the surface of this cone and arranged equidistant are the projecting ribs 27. The base of the cone has formed in it the V-shaped slots 28, which rest over the radial arms 24 of the distributing-spider 22.

Mounted on the shaft 15 within the conical distributing-chamber 11 are the agitators 29, each having two or more blades.

Mounted upon the shaft 15 below the distributing-plate 12 is a distributing-wheel 30. One or more wheels may be employed. This distributing-wheel consists of a hub 31, secured to shaft 15, from which project a series of radial equally-spaced spokes 32, secured at their outer ends to the rim 33. Arranged between the hub 31 and the rim 33 are wires 34, preferably so disposed that two wires will be located, one on the top of the wheel and one on the bottom of the wheel, as illustrated in Fig. 1. Pairs of wires are arranged equidistant around the wheel. I do not limit myself to the precise construction of distributing-wheel shown and described, as it may be otherwise formed. That shown, however, I find suitable to the purpose.

Arranged across the bottom of the inclosing vessel 5 is a plate 35, having the centrally-disposed opening 36. Carried by this plate is a pipe or tube of large diameter, 37, which is rigidly secured within the inclosing vessel by means of the braces 38. Situated on the top of the pipe 37 is a shaped plate 39. This plate I prefer to give substantially the shape shown—that is, approximately conical—with the base of the cone horizontal and the apex carried downward and flared outward to form the discharge-opening 40. The upper surface 41 of this plate I prefer to make smooth, so as not to interfere with the passage of the molasses solution over it. The lower surface of the plate is provided with offsets 42 and ribs 43, by means of which it may be secured to the pipe 37 and which serve to strengthen the plate.

It will be observed from the construction described that the space below the plate 39 is divided into two chambers—i. e., the chamber 44, which I term the "exhaust-chamber," and the chamber 45, which I term the "delivery-chamber." Connected to the exhaust-chamber at the bottom of the inclosing vessel is an eduction-pipe 46, and connected to the delivery-chamber at four points is an induction-pipe 47. Situated between these pipes, so as to draw from one and deliver into the other, there is shown, Fig. 4, a pump 48. Any suitable pump may be employed.

In the modified construction shown in Fig. 4 the plate $35^a$, corresponding to 35, is shown as situated below the cone-shaped plate 39, and located between the plates 35 $35^a$, which are perforated to receive them, are the tubes 49. In this figure the interior of the tubes 49 form a part of the delivery-chamber 45. The space surrounding the pipes 49 and included between one wall of the containing vessel 5, the pipe 37, and the plates 35 $35^a$ I term the "cooling-chamber." This chamber is connected through the pipes 50 $50^a$ with any suitable source of cooling fluid, which by circulating in the cooling-chamber around the pipes 49 acts to cool the solution flowing through them. In this figure I have also shown means for cooling the solution external to the containing vessel, and to accomplish this the eduction and induction pipes 46 47 are surrounded by pipes 51, connected through the pipes 52 $52^a$ with any suitable source of cooling fluid. I do not limit myself in any wise to the apparatus shown in Fig. 4 for cooling the solution within the inclosing vessel or external to the vessel, as very many other devices may be used to accomplish the same result. The cooling devices may, as shown in Fig. 1, be omitted.

The general operation of my device is as follows: Assuming the sugar solution to be flowing over the surface of the plate 39 as a thin stream of uniform thickness and rapidity of flow, the lime, in a fine state of division, is introduced into the hopper 6, from which it falls into the horizontal chamber 7 and under the action of the feed-screw 8 is fed through the chute 10 into the conical chamber 11 and from thence on to the rotating cone 26, to be distributed over the surface of the distributing-plate 12. The rotation of the spider 22 and the movement of the pins 25 in the slots 13 in the distributing-plate serve to cause the lime to pass through the slots as a series of fine streams, which in falling strike the wires 34 of the distributing-wheel 30, which serves to effect a union of such streams or otherwise break up the integrity of such streams of falling lime. The "lime-cloud" formed, as it may be termed, is deposited upon a thin body of the solution, (indicated by dotted lines, Fig. 1,) flowing from the delivery-chamber 45 over the cone-shaped plate 39 and into the exhaust-chamber 44. It will be observed from the drawings, Fig. 1, that the level of the solution in the exhaust-chamber is lower than that in the delivery-chamber. This is due to the action of the pump 48. I prefer that the action of the pump shall be such that but a thin stream or body of solution shall be constantly moved over the upper surface of the cone-shaped plate 39 and that the mouth or discharge-opening 40 of the cone-shaped plate 39 shall be below the level of the solution in the delivery-chamber. This, however, is not essential, but I find that it materially aids in preventing foaming of the solution at this point.

It will be readily understood from the description that the amount of lime which will pass through the distributing-plate 39 will depend upon the number and size of the slots 13 in such plate and the speed of rotation of the spider 22, and that by varying the size of slots 13 and speed of rotation of the spider more or less lime may be caused to pass through this plate within a given period of time and that such device serves to measure the amount of lime delivered within a given unit of time; further, that if a definite thickness and rapidity of movement of stream of solution over the shaped plate 39 is maintained a definite amount of lime will be deposited upon a definite quantity of solution within a definite time.

The action of the cooling arrangement need not be described, as it is well understood.

I wish it understood that I do not limit myself to the particular construction of all of the parts of the apparatus as described or to the collective use of all of such parts, as various changes may be made in or some of such parts omitted—as, for instance, the mechanism for distributing the finely-divided material may be different from that described, or portions of said mechanism—as, for instance, the distributing-cone—may be omitted without in any wise departing from the intent of my invention.

Having thus described my invention, I claim—

1. An apparatus for the purpose described, comprising an inclosing vessel, a cone-shaped plate, means for causing the solution to be treated to move over said plate as a thin stream, and means for depositing the lime in a finely-divided state on the surface of said moving stream.

2. An apparatus for the purpose described, comprising an inclosing vessel, a cone-shaped plate, means for causing the solution to be moved over said plate as a thin stream, and means for uniformly distributing a pulverulent material on the surface of said moving stream.

3. An apparatus for the purpose described, comprising an inclosing vessel, a conical hollow plate, having a discharge-opening at the apex of the cone, means for causing the solution to be treated to move over said plate as a thin stream and to be discharged from said plate through said apex-opening, and means for uniformly depositing a pulverulent material on the surface of said moving stream.

4. An apparatus for the purpose described, comprising an inclosing vessel, a cone-shaped plate, a vertical tube on which said plate is mounted, a perforated plate for supporting said tube and plate, the construction being such, that exhaust and discharge chambers are formed in the body of said inclosing vessel, means for drawing the solution treated from the exhaust-chamber and delivering it into the discharge-chamber in a thin stream and over the cone-shaped plate into the exhaust-chamber.

5. An apparatus for the purpose described, comprising an inclosing vessel, a cone-shaped plate, an exhaust-chamber under said plate, a discharge-chamber also under said plate, and means for circulating a fluid between said chambers and over said plate in a thin stream.

6. An apparatus for the purpose described, comprising an inclosing vessel, a cone-shaped plate, an exhaust-chamber and a discharge-chamber under said plate, said discharge-chamber formed in part of a series of pipes, means for circulating a fluid between said exhaust and discharge chambers, and over said plate as a thin stream, and means for cooling said liquid in its passage.

7. An apparatus for the purpose described, comprising an inclosing vessel, a cone-shaped plate, means for causing the solution to be treated to move over said plate in a thin stream, means for depositing a pulverulent material on the surface of said moving stream, said means consisting of a fixed plate provided with a series of slots, rotating means moving over said plate and which serve to force a pulverulent material through said slots, and means located under said plate for breaking up and consolidating as a cloud the separate streams of pulverulent material forced through the slots in said plate.

8. An apparatus for the purpose described, comprising an inclosing vessel, a cone-shaped plate, means for causing the solution to be treated to move over said plate as a thin stream, means for depositing a pulverulent material on the surface of said moving stream, said means consisting of a fixed plate provided with a series of concentric slots wider at the bottom than at the top, a rotating spider provided with arms having depending pins adapted to register with and move in said slots, and means for rotating the spider.

9. An apparatus for the purpose described, comprising an inclosing vessel, a cone-shaped plate, means for causing the solution to be treated to move over said plate as a thin stream, means for depositing a pulverulent material on the surface of said moving stream, said means consisting of a fixed perforated plate, a rotating spider situated over said plate and carrying means adapted to coact with the surface of said plate and said perforations, to force a pulverulent material discharged on said plate through the openings in said plate, and means for rotating the spider.

10. An apparatus for the purpose described, comprising an inclosing vessel, a cone-shaped plate, means for causing the solution to be treated to move over said plate as a thin stream, means for depositing a pulverulent material on the surface of said moving stream, said means consisting of a fixed perforated plate, a rotating spider, means carried by said spider and adapted to coact with the perforations in said plate to move a pulverulent material discharged on said plate through said perforations, a distributing-cone, and means for rotating said spider and cone.

11. An apparatus of the class described, comprising a feed-hopper, a feed-screw located below said hopper, a rotating distributing-cone onto which said feed-screw discharges, a rotating spider, and a perforated plate located below said spider and distributing-cone and having a horizontal surface onto which said cone delivers and through which said spider moves.

12. In an apparatus of the class described, the combination of a hopper, a feed-screw under said hopper, a rotating distributing-cone, a rotating spider, a perforated plate situated under said spider, and a rotating distributing-wheel situated under said plate.

13. In an apparatus of the class described, the combination of a perforated distributing-plate, a cone-shaped plate over which the solution to be treated is moved as a thin stream, means for discharging the pulverulent material on the distributing-plate, means for moving the pulverulent material through the distributing-plate, and means for uniformly distributing the pulverulent material upon the surface of the solution passing over the cone-shaped plate.

14. In an apparatus of the class described, the combination of a hopper, a feed-screw, a fixed conical receiving-chamber open at its lower end, a distributing-cone situated under said conical chamber, a perforated fixed plate, a spider provided with arms adapted to sweep over said plate, a distributing-wheel located under said distributing-plate, an agitator situated in said conical chamber, and means for moving said wheel, spider and agitator.

15. An apparatus of the class described, comprising an inclosing vessel, a cone-shaped plate having an exhaust-orifice at the apex of the cone, means whereby the solution is caused to flow over the surface of said plate as a thin stream and be maintained at a fixed level near the discharge-orifice of said plate, and means for uniformly distributing a pulverulent material over the surface of the moving stream.

16. An apparatus for the purpose described, comprising an inclosing vessel, a cone-shaped plate, means for causing the solution to be treated to move over said plate as a thin stream, a perforated distributing-plate having a series of concentric slots on its surface, said slots wider at the bottom of the plate than at the top, and a rotating spider provided with radial arms carrying pins adapted to register with and bemoved in said slots.

17. The combination with a distributing-plate having perforations therein, of a rotating spider having radial arms of inverted-V-shaped section, and said arms carrying depending pins adapted to coact with said openings in said plate for the purpose described.

18. In an apparatus of the class described, the combination of a plate having a concave surface and a discharge-opening carried downward, and means for circulating the solution to be treated over said plate in such manner that the solution will flow over the plate as a thin stream and the level of the solution below the plate be above the discharge-orifice in the plate.

19. The combination of a cone-shaped plate having its discharge-opening located at a lower plane than the sides of the plate, a chamber into which said plate is adapted to discharge, means for circulating the solution to be treated over said plate and through said chamber, and for regulating the level of the liquid treated in said chamber and at said plate, whereby foaming is prevented.

20. An apparatus for the purpose described, comprising an inclosing vessel, a cone-shaped plate, means for causing the solution to be treated to move over said plate as a thin stream, a perforated distributing-plate upon which a pulverulent material is discharged, and means for moving the pulverulent material through the distributing-plate and onto the surface of the solution passing over the cone-shaped plate.

21. An apparatus for the purpose described, comprising an inclosing vessel, a cone-shaped plate, means for causing the solution to be treated to move over said plate as a thin stream, a perforated distributing-plate upon which a pulverulent material is discharged, and a rotating device adapted to coact with said plate and move the pulverulent material through the distributing-plate and onto the surface of the solution passing over the cone-shaped plate.

22. An apparatus for the purpose described, comprising an inclosing vessel, a cone-shaped plate, means for causing the solution to be treated to move over said plate as a thin stream, a perforated distributing-plate, a rotating spider, and means carried by said spider adapted to coact with the perforations in said plate to move a pulverulent material discharged on said plate through said perforations.

In testimony whereof I affix my signature in the presence of two witnesses.

GEORGE DINKEL.

Witnesses:
J. E. PEARSON,
FRANK O'CONNOR.